United States Patent [19]
Ihrke et al.

[11] Patent Number: 5,515,219
[45] Date of Patent: May 7, 1996

[54] SIMPLIFIED SELF-LOADING HEAD SLIDER

[75] Inventors: Layne S. Ihrke, Burnsville; Peter Crane, Richfield, both of Minn.

[73] Assignee: Seagate Technology, Inc., Scotts Valley, Calif.

[21] Appl. No.: 380,837

[22] Filed: Jan. 30, 1995

Related U.S. Application Data

[63] Continuation-in-part of Ser. No. 118,004, Sep. 8, 1993, abandoned.

[51] Int. Cl.$^6$ .................................................. G11B 21/21
[52] U.S. Cl. .................................................................. 360/103
[58] Field of Search ..................................... 360/103, 102

[56] References Cited

U.S. PATENT DOCUMENTS

| | | | |
|---|---|---|---|
| 3,855,625 | 12/1974 | Garnier et al. | 360/103 |
| 4,212,044 | 7/1980 | Plotto | 360/103 |
| 4,225,891 | 9/1980 | Plotto | 360/103 |
| 4,420,780 | 12/1983 | Deckert | 360/103 |
| 4,475,135 | 10/1984 | Warner et al. | 360/103 |
| 4,673,996 | 6/1987 | White | 360/103 |
| 5,062,017 | 10/1991 | Strom et al. | 360/103 |
| 5,097,369 | 3/1992 | Matsuzaki | 360/103 |
| 5,128,822 | 7/1992 | Chapin et al. | 360/103 |
| 5,210,666 | 5/1993 | Chapin et al. | 360/103 |
| 5,212,608 | 5/1993 | Yoneoka | 360/103 |

FOREIGN PATENT DOCUMENTS

| | | | |
|---|---|---|---|
| 57-58267 | 4/1982 | Japan . | |
| 59-98347 | 6/1984 | Japan . | |
| 59-119568 | 7/1984 | Japan | 360/103 |
| 59-178648 | 10/1984 | Japan . | |
| 60-013369 | 1/1985 | Japan . | |
| 61-204877 | 9/1986 | Japan . | |
| 62-24489 | 2/1987 | Japan . | |
| 1-319188 | 12/1989 | Japan . | |

OTHER PUBLICATIONS

IBM Technical Disclosure Bulletin, vol. 22, No. 1, Jun. 1979, Garnier, *Air Bearing Magnetic Head Slider*, p. 332.
Yoneoka et al., *A Negative Pressure Microhead Slider for Ultralow Spacing With Uniform Flying Height*, IEEE Trans. Magn., vol. 27, No. 6, pt. 2, pp. 5085–5087, (Nov. 1991).

*Primary Examiner*—Robert S. Tupper
*Assistant Examiner*—William R. Korzuch

[57] ABSTRACT

The present invention is a subambient pressure air bearing slider having a slider body with a leading edge, a trailing edge and first and second side edges. First and second side rails are positioned along the first and second side edges, respectively, with each side rail defining an air bearing surface. The cavity dam extends between the first and second side rails and is recessed from the bearing surfaces. A subambient pressure cavity extends between the first and second side rails adjacent the cavity dam. The leading edge taper is formed along the leading edge and has a surface extending from the leading edge to an intersection with the air bearing surfaces of the first and second side rails. First and second side walls are formed within the leading edge taper between the first and second side edges. The first and second side walls converge towards the leading edge from the intersection of the bearing surfaces and the leading edge taper. As a result, the flying characteristics of the slider are less sensitive to process variations which vary in height of the cavity dam.

12 Claims, 5 Drawing Sheets

Fig. 8C ed between the pattern masks defines the raised side rails and the cross rail. Because the side rails, the cross rail and the subambient pressure cavity are not formed in a single etching cycle, the slider requires an additional lapping step to remove warpage caused by the etching, as discussed above.

SIMPLIFIED SELF-LOADING HEAD SLIDER

This is a continuation-in-part of application Ser. No. 08/118,004 filed Sep. 8, 1993 entitled SIMPLIFIED SELF-LOADING HEAD SLIDER, now abandoned.

BACKGROUND OF THE INVENTION

The present invention relates to transducer head assemblies for rotating disc drives, and more particularly to self-loading air bearing sliders.

Transducer head assemblies that "fly" relative to a rotating disc are used extensively in rotating disc drives. A head assembly includes a gimbal and an air bearing slider for carrying a magnetic transducer proximate the rotating disc. An actuator arm positions the slider and the transducer over individual data tracks on the disc surface. The gimbal is positioned between the slider and the actuator arm to provide a resilient connection which allows the slider to follow the topography of the disc. The gimbal includes a dimple that is in point contact with the slider. The dimple provides a point about which the slider can pitch and roll while following the topography of the disc.

The slider includes a pair of side rails which are positioned along its side edges and are disposed about a recessed area. The side rails form a pair of air bearing surfaces. As the disc rotates, the disc drags air under the slider and along the air bearing surfaces in a direction approximately parallel to the tangential velocity of the disc. As the air passes beneath the side rails, skin friction on the air bearing surfaces causes air pressure between the disc and the air bearing surfaces to increase which creates a hydrodynamic lifting force that causes the slider to lift and fly above the disc surface.

A self-loading, negative (or subambient) pressure air bearing slider (NPAB) includes a cross rail which extends between the side rails and is positioned near the slider's leading edge. The cross rail can also be referred to as a "throat" or a "dam". The cross rail forms a subambient pressure cavity trailing the cross rail, between the side rails. The subambient pressure cavity is typically five to ten microns deep. The air passing beneath the slider expands in the cavity, resulting in a decrease in pressure. The pressure in the cavity may become subambient, in which case the integral of the pressure over the cavity area provides a self-loading force on the slider which forces the slider toward the disc surface. The subambient pressure or suction that is developed in the cavity is a function of cross-bar or cross-rail height above the disc divided by the depth of the cavity. The ratio of cross-rail height to cavity depth is the expansion ratio of the air crossing the cross-rail. The self-loading force counteracts the hydrodynamic lifting force developed along the side rails. The counteraction between positive and negative forces on the slider reduces flying height sensitivity with respect to disc velocity and increases air bearing stiffness.

The disc tangential velocity is greater at an outer disc diameter than at an inner disc diameter. The magnitude of the positive pressure developed along the side rails increases with the sliding velocity. However, the magnitude of the self-loading force also increases with the sliding velocity. The increasing self-loading force prevents the increasing positive pressure from forcing the slider away from the disc. The equilibrium clearance of the self-loading air bearing slider is therefore less dependent on sliding velocity than a conventional air bearing slider.

The self-loading air bearing slider is also stiffer than the conventional air bearing slider. This effect is due to relatively large surface areas that are required to support the slider at a specified clearance. The surface area of the self-loading bearing must be larger than that of a conventional bearing, to provide adequate lifting force to resist the self-loading force as well as a spring pre-load force applied by the actuator arm.

It has been found that the advantages of the self-loading air bearing slider are maximized by making the subambient pressure cavity area as large at possible. Warner et al., U.S. Pat. No. 4,475,135, disclose a self-loading air bearing slider having a pair of side rails and a cross rail which is positioned at the slider's leading edge. The cross rail lies in a plane defined by the side rails and includes a full-width taper at the leading edge. The full-width taper provides a faster liftoff from the disc surface.

Although the slider disclosed by Warner et al. maximizes the area of the subambient pressure cavity, it also has undesirable features. First, the full-width leading taper tends to collect wear particles and similar debris. This debris sheds occasionally and is dragged between the slider and the disc, causing increased wear to the air bearing surfaces and the disc surface. Second, the cross rail and the leading edge taper cause the slider to fly with an unusually high pitch angle. A very high pitch angle degrades the stiffness of the air bearing.

Chapin et al., U.S. Pat. No. 5,210,666, disclose a self-loading air bearing slider with a relieved leading edge. The cross rail includes a relief or "notch" which is recessed from the air bearing surfaces. The "notch" minimizes debris collection at the leading edge and reduces pitch angle. Various other flying characteristics are also improved, such as reduced flying height sensitivity to altitude and higher vertical and roll stiffness.

However, the slider disclosed by Chapin et al. requires several fabrication steps to manufacture. When fabricated by an ion milling process, the slider is initially lapped to a smooth and flat surface suitable for application of milling pattern masks. To fabricate the leading taper at the leading edge, the leading edge of the slider is lapped at an angle. Next, two etching cycles using two separate masks are required to create the desired air bearing topography. One etching cycle is required to recess the cross rail from the air bearing surface by a depth of about 1.2 micron. Another etching cycle is required to form the relatively deep subambient pressure cavity. The material left between the pattern masks defines the cross-rail. Because residual lapping stresses are relieved by the etching, some warpage of the slider typically occurs. As a result, an additional lapping step is performed on a spherically dished lapping plate to obtain a flying surface with a specified crown height. The reflat process removes approximately 0.2 microns such that the cross rail has a finished cross rail depth of about 1.0 microns below the air bearing surface. The additional lapping step (known as a reflat process) assures that warping is removed and that the slider is properly crowned.

Similarly, Strom et al., U.S. Pat. No. 5,062,017, disclose a self-loading hour-glass disc head slider that requires at least a two cycle etching process for fabrication. One etching cycle is required to create relatively shallow, partial edge steps into a pair of raised side rails to form generally hour-glass shaped air bearing surfaces. The cross rail is etched at the same time as the partial edge steps to relieve the cross rail from the air bearing surfaces by the same depth as the partial edge steps. Another etching cycle is required to form a relatively deep subambient pressure cavity between the pair of raised side rails. The material left between the two patterned masks used in the two etching cycles defines the cross-rail. As with the slider disclosed by Chapin et al., the slider disclosed by Strom et al. experiences warpage caused by residual lapping stresses being relieved by the etching cycles. Consequently, the reflat process is also performed on the slider of Strom et al. to obtain a flying surface with a specified crown height.

Each of the fabrication steps required to manufacture the sliders disclosed by Chapin et al. and Strom et al. cause variations in the finished slider cross rail height above the disc surface. Because each of the fabrication steps are not entirely controllable, variations in the initial 1.2 micron etching fabrication step and the reflat stock removal cause variations in the height of the cross rail. Because the cross rail height determines the suction that is developed in the cavity, the cross rail height significantly effects flying height of the finished slider. Variations in the cross rail height cause variations of subambient pressures within the pressure cavity which in turn creates flying height variation.

Moreover, each additional fabrication step that is required to manufacture advanced air bearing sliders increases the time required for fabrication, increases slider fabrication cost, reduces slider yield by stacking up additional tolerances, and complicates slider design and modeling.

SUMMARY OF THE INVENTION

The present invention is a subambient pressure air bearing slider having a slider body with a leading edge, a trailing edge and first and second side edges. First and second side rails are positioned along the first and second side edges, respectively, with each side rail defining an air bearing surface. A cavity dam extends between the first and second side rails and is recessed from the bearing surfaces. A subambient pressure cavity extends between the first and second side rails adjacent the cavity dam. The leading edge taper is formed along the leading edge and has a surface extending from the leading edge to an intersection with the air bearing surfaces of the first and second side rails. First and second side walls are formed within the leading edge taper between the first and second side edges. The first and second side walls converge towards the leading edge from the intersection of the bearing surfaces and the leading edge taper. As a result, the flying characteristics of the slider are less sensitive to process variations which vary the height of the cavity dam.

In a first embodiment of the present invention, the subambient pressure air bearing slider has a slider body with a leading edge, a trailing edge and first and second side edges. First and second raised side rails are positioned along the first and second side edges, respectively, with each side rail defining an air bearing surface. A leading edge taper is formed along the leading edge and extends from the leading edge to an intersection with the air bearing surfaces of the first and second raised side rails. A subambient pressure cavity is position between the first and second raised side rails. The subambient pressure cavity extends forward along the slider body toward the leading edge, past the intersection between the leading edge taper and the air bearing surfaces, and terminates prior to the leading edge. The subambient pressure cavity includes first and second side wails within the leading edge taper which converge toward one another as the side walls extend toward the leading edge. The converging side walls are preferred since they minimize the effect on flying height sensitivity of variances in the length of the leading edge taper and variances caused by mask shift during fabrication.

The slider of the present invention requires only one cycle through the etching process, as opposed to a two cycle process for similar sliders of the prior art. A separate cavity dam (or cross rail) is eliminated and replaced with a leading edge taper that extends across the entire leading edge. The subambient pressure cavity is shaped such that it extends into the leading edge taper, thereby creating a "dam" of equivalent height offset from the air bearing surfaces due to the taper. In one embodiment, the subambient pressure cavity extends into the leading edge taper to a location at which the leading edge taper is recessed from the air bearing surfaces by approximately one micron (micrometer). The relieved leading edge taper maintains the subambient pressure cavity while minimizing the surface area of the slider body that contacts the disc. Minimizing the surface area in contact with the disc improves contact "start/stop" performance by reducing the length of water film meniscus which causes stiction.

Potential cost benefits of the one cycle etching process include an increase in slider fabrication throughput, a decrease in slider fabrication cost, an increase in slider yield, and simplified slider design and modeling. Potential performance benefits include a better control of flying height due to a reduction in tolerance stack up from conventional, multi-cycle ion milling.

In a second embodiment of the present invention, the subambient pressure air bearing slider has a slider body with a leading edge, a trailing edge and first and second side edges. First and second raised side rails are positioned along the first and second side edges, respectively, with each side rail defining an air bearing surface. A cavity dam extends between the first and second raised side rails and is recessed from the bearing surface. A subambient pressure cavity extends between the first and second side rails and adjacent the cavity dam. A leading edge taper is formed along the leading edge and has a surface extending from the leading edge to an intersection with the bearing surfaces of the first and second side rails. First and second side walls extend above the cavity dam within the leading edge taper between the first and second side edges. The first and second side walls converge towards the leading edge from the intersection of the bearing surfaces and the leading edge taper. The converging side walls minimize flying height variations caused by variations in the reflat stock removal during fabrication.

DETAILED DESCRIPTION OF THE PREFERRED EMBODIMENTS

The present invention is an advanced self-loading, subambient pressure air bearing slider which is configured for use in a rotating disc drive. The slider includes a subambient pressure cavity which partially extends into a leading edge taper, thereby creating a cavity "dam" that is offset by about 1.0 micron from a pair of air bearing surfaces. The slider requires only one etching cycle to manufacture, as opposed to a current two cycle process. Since the subambient pressure cavity extends into the leading edge taper, a second etching cycle is not required to relieve the cavity dam from the air bearing surfaces. The present invention preserves many advantages of advanced air bearing designs while simplifying their fabrication.

Figure 1:
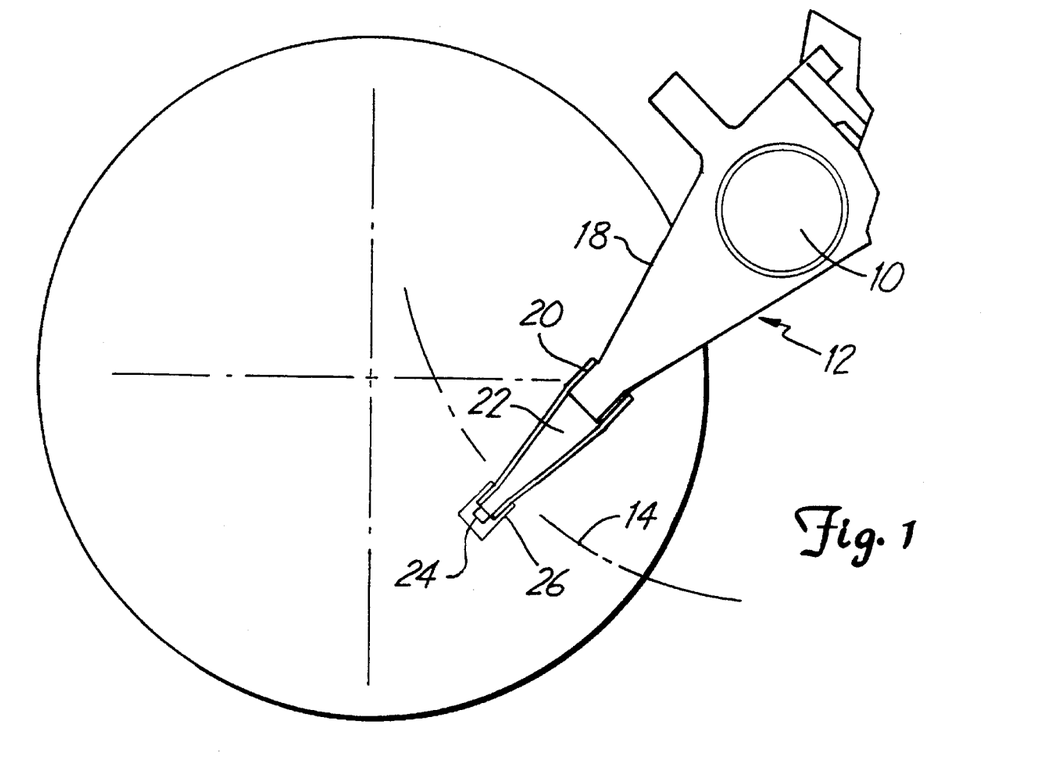
FIG. 1 is a top plan view of an actuator arm supporting a transducer head assembly over a rotating disc.

FIG. 1 is a top plan view of a disc drive with an actuator arm supporting a transducer (not shown) over a rotating disc. An actuator 10 and an actuator arm 12 support the transducer proximate to the surface of disc 16. Arm 12 includes a supporting arm 18, a base plate 20 and a load beam 22. Load beam 22 is connected to a gimbal spring 24 which carries an air bearing slider 26. Actuator 10 rotates arm 12 to position slider 26 over various data tracks (not shown) on the disc surface along arc 14. Slider 26 carries a transducer (not shown) which communicates with data locations on the disc surface. Although slider 26 is described as an air bearing slider, the present invention can also be applied to other hydrodynamic sliders.

Figure 2:
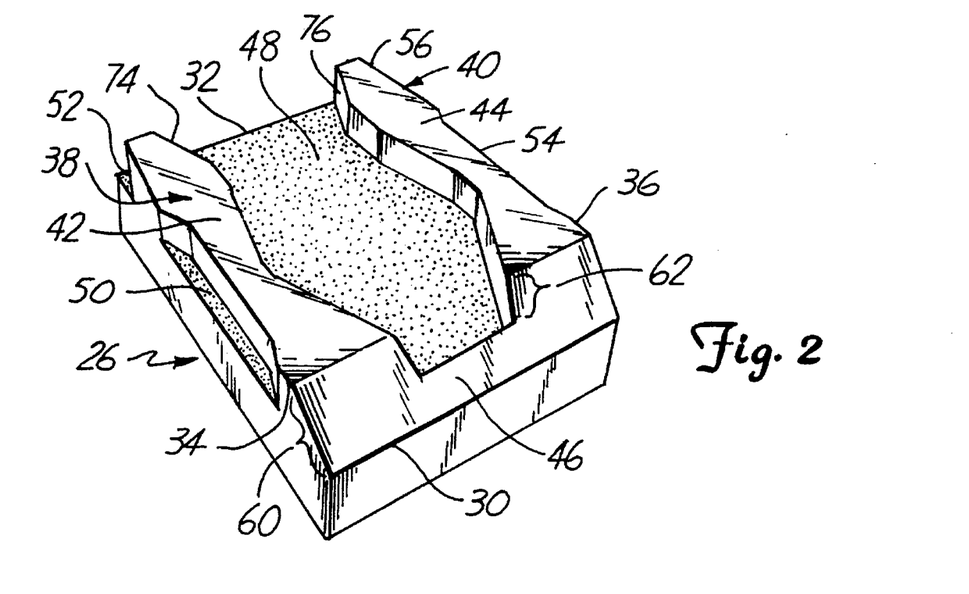
FIG. 2 is a perspective view of a self-loading, subambient pressure air bearing slider in accordance with the present invention.

FIG. 2 is a perspective view of slider 26, as viewed from the disc surface. Slider 26 is a self-loading, subambient pressure air bearing (NPAB) slider in accordance with the present invention. Slider 26 includes a leading edge 30, a trailing edge 32, and first and second side edges 34 and 36. A pair of side rails 38 and 40 are positioned along first and second side edges 34 and 36, respectively, and extend between leading edge 30 and trailing edge 32. Side rails 38 and 40 form air bearing surfaces 42 and 44. A cavity dam 46 defines a subambient pressure cavity 48 which trails the cavity dam, between side rails 38 and 40. Cavity dam 46 is positioned at leading edge 30. Side rails 38 and 40 may include relatively deep outside edge steps 50, 52, 54 and 56.

As disc 16 (shown in FIG. 1) rotates, the disc drags air under slider 26 and along air bearing surfaces 42 and 44 in a direction approximately parallel to the tangential velocity of the disc. As the air passes beneath air bearing surfaces 42 and 44, skin friction on the air bearing surfaces causes the air pressure between disc 16 and the air bearing surfaces to increase which creates a hydrodynamic lifting force that causes slider 26 to lift and fly above the disc surface.

As the air passes over cavity dam 46, the air expands into cavity 48 causing a decrease in pressure. The pressure in cavity 48 may become subambient, in which case the integral of the pressure over cavity 48 provides a self-loading force on the bearing which forces slider 26 toward the disc surface. The self-loading force counteracts the hydrodynamic lifting force.

Leading edge 30 includes a full-width leading edge taper 60 which extends between side edges 34 and 36 and intersects with air bearing surfaces 42 and 44. Taper 60 directs more air beneath air bearing surfaces 42 and 44 during take-off, which causes slider 26 to lift off of the disc surface at lower disc speeds. This reduces the time during which slider 26 is in contact with the disc surface and therefore reduces wear on air bearing surfaces 46 and 48 and on the disc surface.

Preferably, cavity dam 46 is slightly recessed from air bearing surfaces 42 and 44 to minimize the surface area of slider 26 that contacts the surface of disc 16. Cavity dam 46 is recessed by extending a portion 62 of subambient pressure cavity 48 laterally into leading edge taper 60. Recessing cavity dam 46 minimizes debris collection, further minimizes wear on slider 26 and on the surface of disc 16 and minimizes the starting torque of disc 16.

Stiction occurs in a high humidity, low temperature environment when water condenses between the bearing surface of the slider and the disc surface. The water film forms a meniscus around the perimeter of the bearing surface. The surface tension in the meniscus causes the slider to stick to the disc. The spindle motor must develop enough torque to break the water film loose to start the disc spinning. Sliders with small bearing surfaces have smaller bearing perimeters and therefore have a shorter length of meniscus and have less stiction. As a result, less starting torque is required to start the disc spinning. Limiting the starting torque becomes important in small disc drives which do not have enough package space to house a high-torque motor.

Figure 3A:
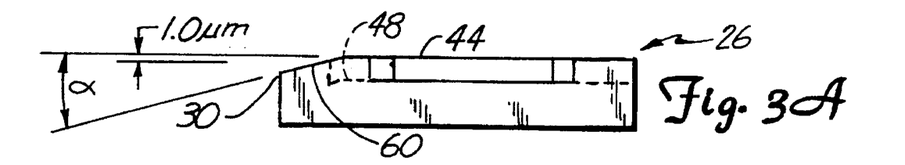
FIG. 3A is a side plan view of the self-loading, subambient pressure air bearing slider shown in FIG. 2.
Figure 3B:
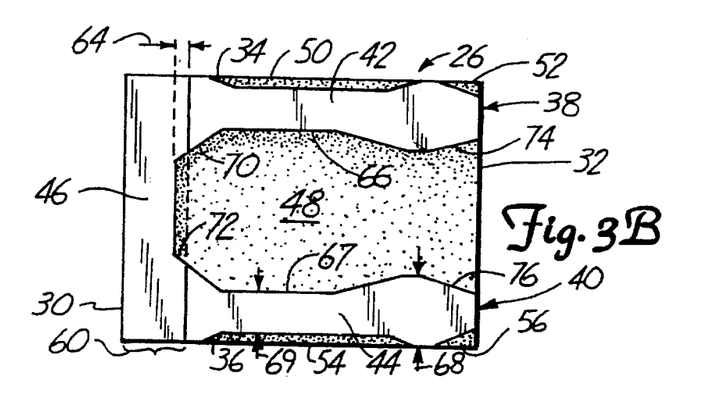
FIG. 3B is a top plan view of the self-loading, subambient pressure air bearing slider shown in FIGS. 2 and 3A.

The recess is shown in greater detail in FIGS. 3A and 3B. In a preferred embodiment, subambient pressure cavity 48 extends into leading edge taper 60 by a distance 64 (shown in FIG. 3B) that is sufficient to recess cavity dam 46 from air bearing surfaces 42 and 44 by about 0.5 to 2.0 microns, and preferably about 1.0 microns (shown in FIG. 3A). If leading edge taper 60 forms an angle $\alpha$ of about 0.008 radians with air bearing surfaces 42 and 44, then the distance (distance 64) that subambient pressure cavity 48 should extend into leading edge taper 60 is about 125 microns (micrometers). However, distance 64 can vary depending upon the desired depth of the recess and the angle $\alpha$ of leading edge taper 60. The distance generally ranges from about 0 to ½ a length of leading edge taper 60, as measured from the intersection with air bearing surfaces 42 and 44 toward leading edge 30.

Fabrication of slider 26 requires only one etching cycle to manufacture, as opposed to a current two cycle process (discussed with reference to FIGS. 5, 6A and 6B). The contour of the air bearing surface is formed by dry or wet etching. In a preferred embodiment, the contour is formed by ion milling. However, any known method of etching can be used to fabricate a slider in accordance with the present invention. Examples of suitable fabrication processes are described generally in U.S. Pat. Nos. 4,495,135 and 4,673,996. The subambient pressure cavity 48 and, if desired, the outside edge steps 50, 52, 54, and 56 are etched in one cycle.

In one embodiment, these areas are etched to a depth of about four to seven microns (micrometers). Since subambient pressure cavity 48 extends laterally into leading edge taper 60, the formation of the subambient pressure cavity results in a slightly recessed cavity dam 46, due to the taper. This eliminates the need for performing a second etching cycle to recess cavity dam 46 from air bearing surfaces 42 and 44.

As shown in FIGS. 2 and 3B, subambient pressure cavity 48 includes side walls 70 and 72 within leading edge taper 60 that converge together as the side walls extend toward leading edge 30. Preferably, side walls 70 and 72 converge towards one another at an angle between about 20 to 70 degrees with respect to the intersection of the leading edge taper and the air bearing surfaces. Side walls 70 and 72 optimally converge towards one another at an angle of about 70 degrees with respect to the intersection of the leading edge taper and the air bearing surfaces. As can be appreciated, the optimum angle at which side walls 70 and 72 converge towards one another is highly dependent upon the precise slider configuration. In particular, the angle at which side walls 70 and 72 cross the intersection of the leading edge taper and the air bearing surface (also known as the leading taper break) is dependent upon three factors. First, the width of the air bearing surfaces 150 and 152 must be sufficient to support leading edge 132 at a specified pitch angle. Second, the width of the relieved cross rail upstream of the taper break towards the leading edge must be sufficient to obtain the advantages of insensitivity of suction force to slider pitch angle. Lastly, the length of side walls 70 and 72 which cross the taper break must be sufficient to contain most of the possible variations in the finished taper break location, considering variations in the initial taper length, reflat stock removal and mask alignment.

Figure 4:
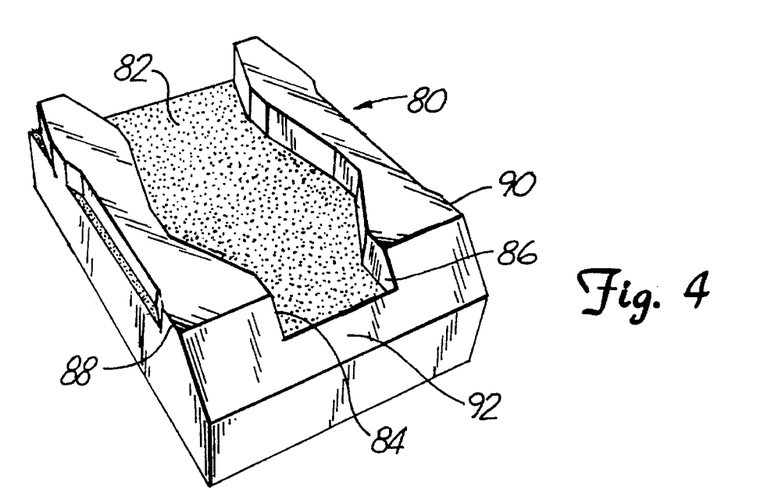
FIG. 4 is a perspective view of an alternative self-loading, subambient pressure air bearing slider in accordance with the present invention.

An alternative embodiment is shown in FIG. 4. Slider 80 includes a subambient pressure cavity 82 with side walls 84 and 86 within leading edge taper 92 that extend generally parallel to side edges 88 and 90. Preferably, leading edge taper 60 and leading edge taper 92 have approximately the same surface area to maximize air being pressurized at their respective leading edges without causing their respective leading edges to have too great of a degree of pitch with respect to surface of the disc.

Converging side walls 70 and 72 are preferred over parallel side walls 84 and 86 since the flying characteristics of the embodiment shown in FIGS. 2 and 3B are overall less sensitive to tolerances in manufacture than the embodiment shown in FIG. 4. In particular, it has been discovered that the flying characteristics are less sensitive to shifting of the photoresist layer and variations in the length of leading edge taper 60. Because the side walls of the subambient pressure cavity converge together, the leading edge taper is wider towards a leading edge of the slider and is narrower towards the trailing edge of the slider. As a result, if lapping process variations cause the intersection between the leading edge taper and the bearing surface to be moved forward towards the leading edge of the slider, the surface area removed from the leading edge taper is reduced because the increased width of the leading edge taper towards the leading edge. Alternatively, if lapping process variations cause the intersection between the leading edge taper and the bearing surface to be moved rearward, the surface area added to the leading edge taper is reduced because of the reduced width of the leading edge taper as the taper extends towards the trailing edge of the slider. As a result, converging side walls 70 and 72 within the leading edge taper reduce the length of the leading edge taper caused by variations in the initial fabrication of the leading edge taper. Consequently, converging side walls 70 and 72 reduce the degree by which flying height of the slider varies caused by variations in lapping processes.

Although converging side walls 70 and 72 slightly increase the area of the leading edge taper, which in turn causes more air to be pressurized at the leading edge of the slider, converging side walls 70 and 72 do not significantly effect the overall flying height or the lift-off time of slider 26. Slightly increasing the area of leading edge taper 60 does not produce a faster lift-off or affect the flying height of slider 26. As the area of leading edge taper 46 is increased, more air is pressurized at the leading edge which in turn causes the slider to have a higher degree of pitch. In other words, as more air is pressurized at the leading edge, the leading edge is lifted higher while the trailing edge 32 of slider 26 flies at substantially the same flying height above the disc. This increased pitch of slider 26 creates more space between inner bearing surfaces 42 and 44 and the surface of the disc such that a larger amount of air pressure is dissipated away from the inner bearing surfaces 42 and 44 towards trailing edge 32 of slider 26. Thus, converging side walls 72 and 74 do not significantly affect the flying height or overall lift-off time of slider 26. As a result, slider 26 can be more easily manufactured so that the area of leading edge taper 60 more closely approximates the desired optimum leading edge taper surface area despite lapping process variations. Consequently, leading edge taper 60 has a surface area which is neither too small such that insufficient air is pressurized at the leading edge or too large such that the flying height is actually reduced caused by too much air pressure being dissipated away from the air bearing surfaces because of too large of a degree of pitch.

Referring back to FIG. 3B, slider 26 has side rails 38 and 40 that have generally "hour-glass" shapes. Outside edge steps 50 and 54 are formed in a portion of the outside edges of side rails 38 and 40, respectively, such that the side rails narrow between leading edge 30 and trailing edge 32. In addition, a portion of the inside edges of side rails 38 and 40 include inside edge steps 66 and 67 which further shape the side rails. Inside edge steps 66 and 67 and outside edge steps 50 and 54 are optional and are formed during the same etching cycle as subambient pressure cavity 48. Therefore, the edge steps are recessed from air bearing surfaces 42 and 44 by depths that are substantially equal to the depth of subambient pressure cavity 48.

The hour-glass shapes maintain a near constant air bearing surface area and pressure distribution as slider 26 flies at varying skew angles with respect to air flow. As a result, the hour-glass shapes minimize slider roll about a central axis of slider 26. The hour-glass shapes also maximize slider stiffness by maximizing the counteraction between positive and subambient pressure. The surface area of air bearing surfaces 42 and 44 is largest near the ends of side rails 38 and 40 and smallest near the center of the rails. This maximizes positive pressure near the ends of rails 38 and 40 while maximizing the subambient pressure area 48 near the center of slider 26. The hour-glass shapes and the resulting pressure profiles on air bearing surfaces 42 and 44 are discussed in greater detail in Strom et al., U.S. Pat. No. 5,062,017, which is hereby incorporated by reference.

The width of side rails 38 and 40 controls the flying height. High speed drives have narrower rails than low speed drives in order to have the same flying height. The hour-glass shaped side rails 38 and 40 include a trailing pad width 68 and a waist width 69. The ratio of the trailing pad width 68 to the waist width 69 controls skew sensitivity. The ratio may range from about 1.0 to about 4.0. For low speed (small form factor) drives, the skew sensitivity should be higher to get the flying height at an outer disc diameter down to the flying height at an inner disc diameter. In one embodiment, trailing pad width 68 is 0.016 inches (410 microns) and waist width 69 is 0.004 inches (102 microns).

The transverse offset of waist width 69 with respect to first and second side edges 34 and 36 controls slider roll about its central axis. The transverse offset can range from no offset, in which the outer edge of side rail 40 is straight and the inside edge is "crooked", to a full offset, in which the outside edge is crooked and the inside edge is straight. In one embodiment, steps 50 and 54 offset waist width 69 from side edge 36 by about 0.002 to 0.004 inches (51 to 102 microns).

Slider 26 further includes relieved rail ends 74 and 76 for shifting the center of positive pressure slightly forward along the slider body. The relieved rail ends are discussed in greater detail in copending application of Chapin et at., U.S. Ser. No. 08/044,926, filed Apr. 8, 1993, which is hereby incorporated by reference. Ser. No. 08/044,926 is a continuation of Ser. No. 07/715,453, filed Jun. 14, 1991, which is a continuation-in-part of U.S. Pat. Nos. 5,128,822 and 5,062,017.

Figure 5:
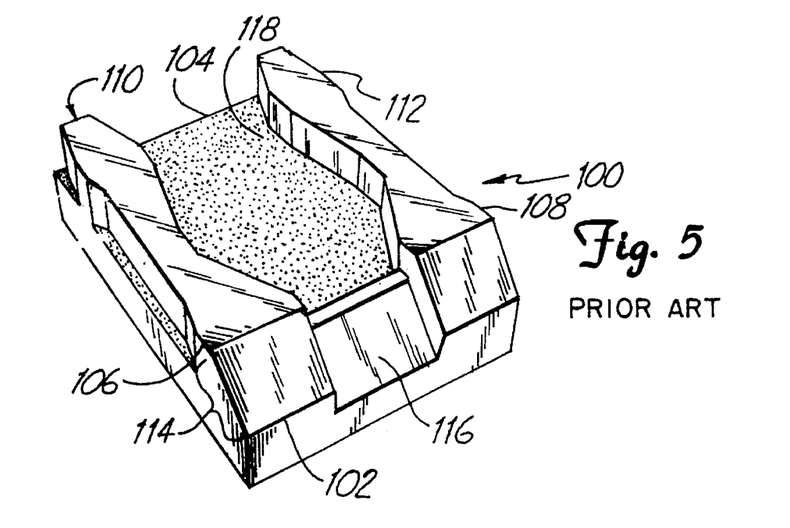
FIG. 5 is a perspective view of a self-loading, subambient pressure air bearing slider of the prior art.
Figure 6A:
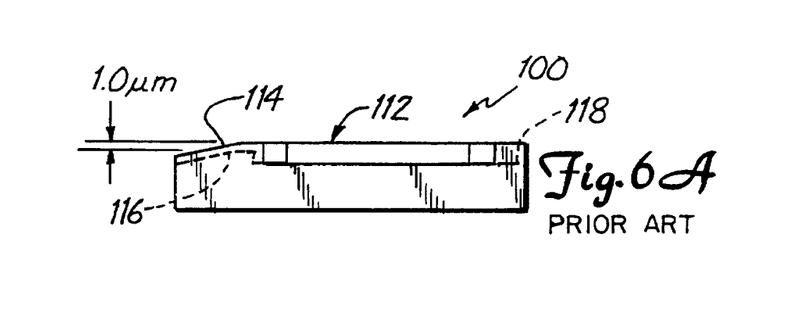
FIG. 6A is a side plan view of the self-loading, subambient pressure air bearing slider of the prior art shown in FIG. 5.
Figure 6B:
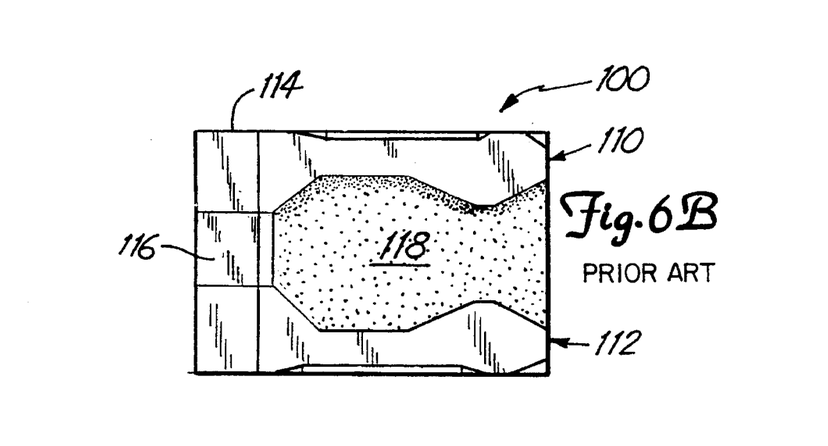
FIG. 6B is a top plan view of the self-loading, subambient pressure air bearing slider of the prior art shown in FIGS. 5 and 6A.

FIG. 5 is a perspective view of a slider of the prior art having a subambient pressure cavity that terminates prior to a leading edge taper. Slider 100 includes leading edge 102, trailing edge 104 and first and second side edges 106 and 108. Raised side rails 110 and 112 are positioned along first and second side edges 106 and 108, respectively, and extend between leading edge 102 and trailing edge 104. A full-width leading edge taper 114 extends along leading edge 102. A cavity dam 116 is positioned at leading edge 102 and defines a subambient pressure cavity 118 which trails the cavity dam, between side rails 110 and 112. Cavity dam 116 is recessed from side rails 110 and 112 by about 1.0 micron (micrometer). Subambient pressure cavity 118 is recessed from side rails 110 and 112 by about 4.0 to 7.0 microns. Subambient pressure cavity 118 terminates prior to leading edge taper 114. Alternative views of slider 100 are provided in FIGS. 6A and 6B.

The fabrication process of slider 100 requires two etching cycles. Since subambient pressure cavity 118 does not extend within leading edge taper 116, cavity dam 116 must be recessed in a separate etching cycle from the cycle that forms the subambient pressure cavity. Each additional fabrication step required to form slider 100 adds time to the fabrication process and adds an additional tolerance that adversely affects fly height control.

Figure 7A:
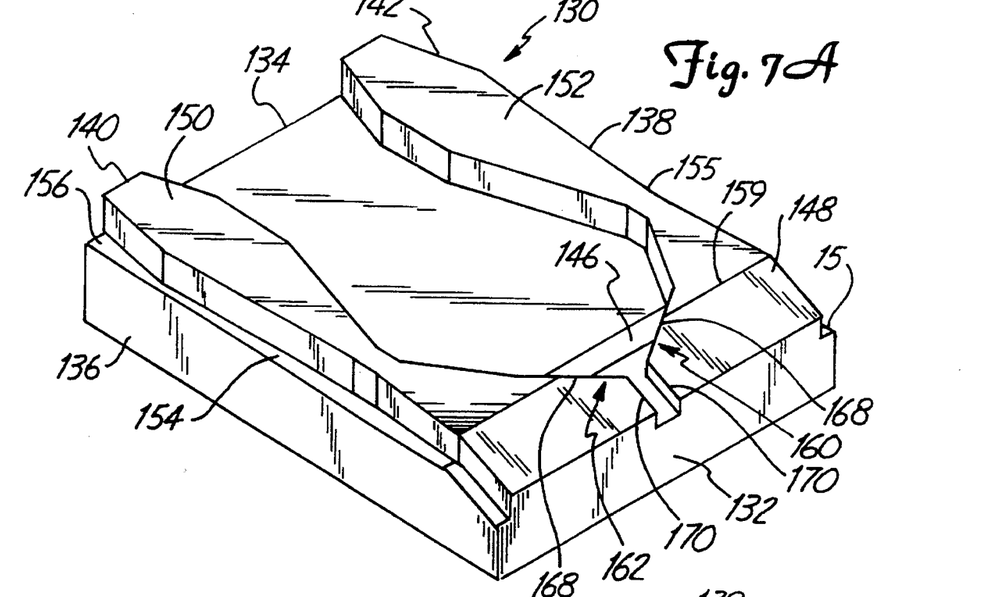
FIG. 7A is a perspective view of an alternative self-loading, subambient pressure air bearing slider in accordance with the present invention.
Figure 7B:
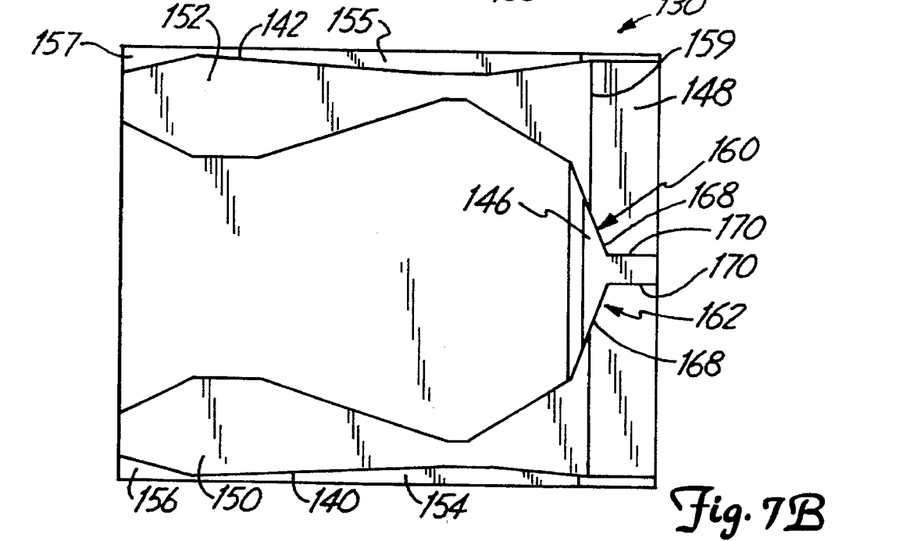
FIG. 7B is a top plan view of the self-loading, subambient pressure air bearing slider of FIG. 7A.
Figure 7C:
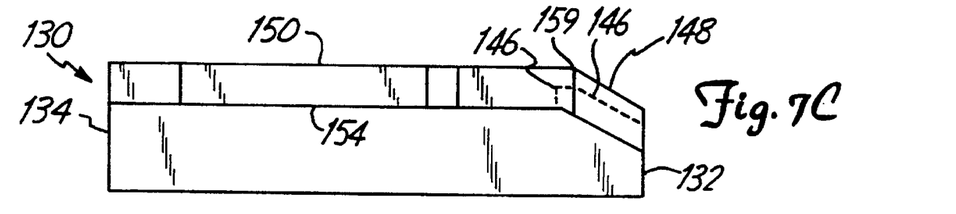
FIG. 7C is a side plan view of the subambient pressure air bearing slider of FIG. 7A.

FIGS. 7A, 7B and 7C illustrate alternative views of slider 130. FIG. 7A is a perspective view of slider 130. FIG. 7B is a side sectional view of slider 130. FIG. 7C is a top plan view of slider 130. As shown by FIGS. 7A, 7B and 7C, slider 130 is a self-loading, subambient pressure air bearing (NPAB) slider in accordance with the present invention. Slider 130 includes a leading edge 132, a trailing edge 134 and first and second side edges 136 and 138. Slider 130 further includes side rails 140 and 142, cavity dam 146, and leading edge taper 148. Side rails 140 and 142 extend along side edges 136 and 138, respectively, and extend between leading edge 132 and trailing edge 134. Side rails 140 and 142 form and define air bearing surfaces 150 and 152, respectively. Side rails 140 and 142 may additionally include relatively deep outside edge steps 154, 155, 156 and 157. Air bearing surfaces 144 and 146 formed by side rails 140 and 142 lifts slider 130 above the disc surface. As disc 16 (shown in FIG. 1) rotates, the disc drags air under slider 130 and along air bearing surfaces 150 and 152 in a direction approximately parallel to the tangential velocity of the disc. As the air passes beneath air bearing surfaces 150 and 152, skin friction on the air bearing surfaces causes the air pressure between disc 16 and the air bearing surfaces to increase which creates a hydrodynamic lifting force that causes slider 130 to lift and fly above the disc surface.

Cavity dam 146 is positioned between side rails 140 and 142 and has a height recessed from air bearing surfaces 150 and 152 to minimize the surface area of slider 130 contacting the surface of disc 16. Recessing cavity dam 146 minimizes debris collection, minimizes wear on slider 130 and on the surface of disc 16, and minimizes stiction so as to minimize torque of disc 16. Cavity dam 146 and side rails 140 and 142 define subambient pressure cavity 156. Subambient pressure cavity 156 is positioned between side rails 140 and 142 adjacent cavity dam 146. As air passes over cavity dam 146, the air expands into subambient pressure cavity 156 causing a decrease in pressure. Depending upon the depth of cavity 156, the pressure within cavity 156 may become subambient, in which case the integral of the pressure over cavity 156 provides a self-loading force on the slider which causes slider 140 toward the disc surface. The self-loading force counteracts the hydrodynamic lifting force of air bearing surfaces 150 and 152 so that slider 130 preferably flies at an optimum height above the surface of disc 16.

Leading edge taper 148 is generally a full-width leading edge taper which extends between side edges 136 and 138 adjacent leading edge 132. Taper 148 intersects air bearing surface 150 and 152 about taper break line 159.

Leading edge taper 148 includes side walls 160 and 162. Side walls 160 and 162 extend within leading edge taper 148 between side edges 136 and 138 from the intersection of leading edge taper 148 and the air bearing surfaces 150 and 152 to leading edge 132. Side walls 160 and 162 each include a converging portion 168 and a parallel portion 170. Converging portions 168 of side walls 160 and 162 converge towards one another from the intersection of leading edge taper 148 and the air bearing surfaces 150 and 152 towards leading edge 132. Preferably, portions 168 of side walls 160 and 162 converge towards one another at an angle between about 20 to 70 degrees with respect to the intersection of the leading edge taper and the air bearing surfaces. Portions 68 of side walls 160 and 162 optimally converge towards one another at an angle of about 70 degrees with respect to the intersection of the leading edge taper and the air bearing surfaces. As can be appreciated, the optimum angle at which portions 68 of side walls 70 and 72 converge towards one another is highly dependent upon the precise slider configuration. In particular, the angle at which side walls 160 and 162 cross the intersection of the leading edge taper and the air bearing surface (also known as the leading taper break) is dependent upon three factors. First, the width of the air bearing surfaces 150 and 152 must be sufficient to support leading edge 132 at a specified pitch angle. Second, the width of the relieved cross rail upstream of the taper break towards the leading edge defined between parallel portions 170 of side walls 160 and 162 must be sufficient to obtain the advantages of insensitivity of suction force to slider pitch angle. Lastly, the length of portions 68 of side walls 160 and 162 which cross the taper break must be sufficient to contain most of the possible variations in the finished taper break location, considering variations in the initial taper length, reflat stock removal and mask alignment.

It has been discovered that because side walls 160 and 162 converge towards one another as they cross the taper break, the flying height of the outer rail is less sensitive to variations in the final reflat stock removal fabrication step. As a result, an optimum flying height of the outer rail of slider 130 is more easily obtained despite variations in finished slider 130 having varying heights of cavity dam 146, varying depths of cavity 156 and varying lengths of leading edge taper 148. At the same time, the flying height of the outer rail is not significantly affected by converging side walls 160 and 162 towards one another as compared to the non-converging, generally parallel side walls within the leading edge taper 116 of the prior art slider 100 (shown in FIGS. 5, 6A and 6B). Consequently, slider 130 of the present invention, is more likely to fly at the optimum flying height above disc 16 despite variations in the reflat process used to fabricate slider 130.

Figure 8A:
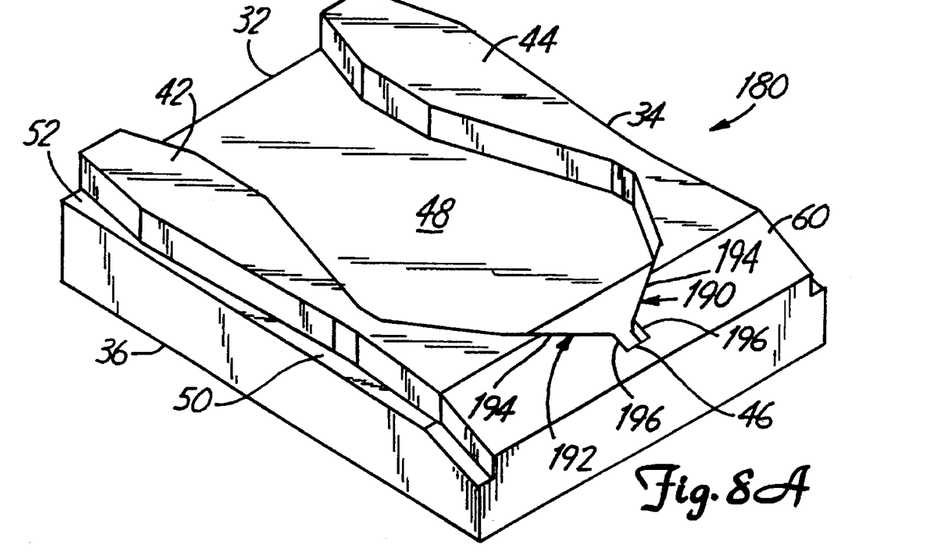
FIG. 8A is a perspective view of an alternative self-loading, subambient pressure air bearing slider in accordance with the present invention.
Figure 8B:
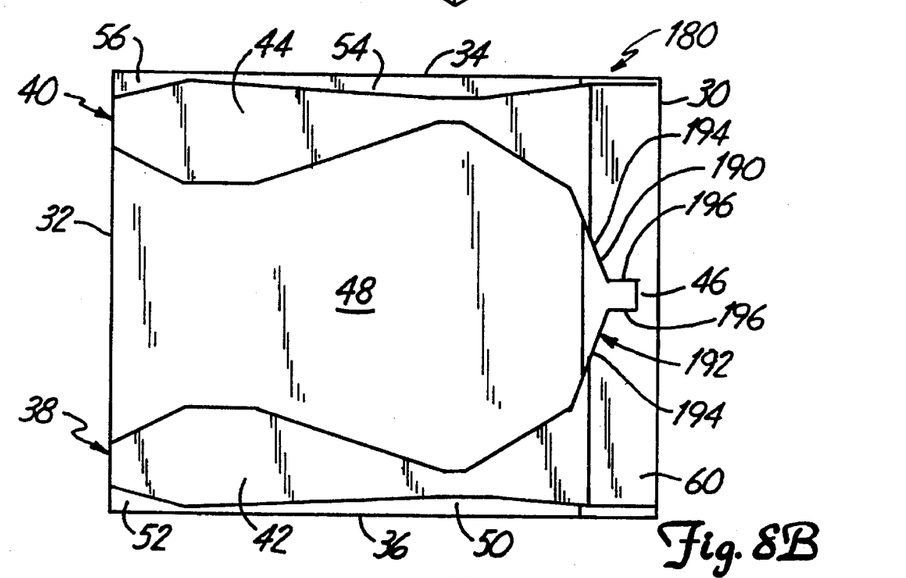
FIG. 8B is a top plan view of the self-loading, subambient pressure air bearing slider of FIG. 8A.
Figure 8C:
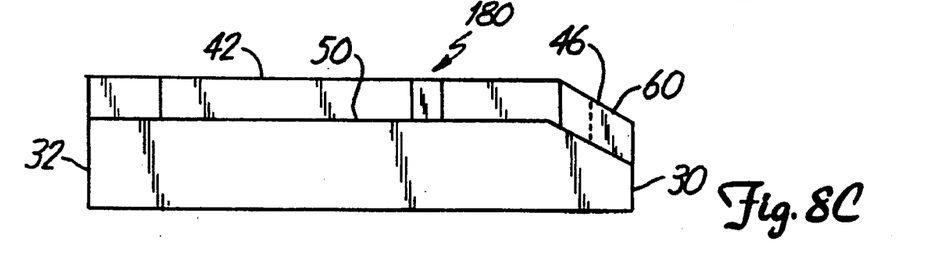
FIG. 8C is a side plan view of the subambient pressure air bearing slider of FIG. 8A.

FIGS. 8A, 8B and 8C illustrate alternative views of slider 180. Slider 180 is an alternate embodiment of slider 26 shown in FIGS. 2, 3A and 3B. Slider 180 is similar to slider 26 except that side walls 70 and 72 are replaced with side walls 190 and 192. For ease of illustration, the remaining elements of slider 180 which are the same as those elements of slider 26 are numbered similarly. Side walls 190 and 192 are similar to side walls 70 and 72 except that side walls 190 and 192 each include a converging portion 194 and a parallel portion 196. Converging portions 194 of side wails 190 and 192 converge towards one another from the intersection of the leading edge taper 60 and air bearing surfaces 42 and 44 after the reflat process has been performed towards leading edge 30. Preferably, converging portions 194 of side wails 190 and 192 converge towards one another at an angle between about 20 to about 70 degrees with respect to the intersection of leading edge taper 60 and air bearing surfaces 42 and 44. Converging portions 194 optimally converge towards one another at an angle of about 70 degrees with respect to the intersection of the leading edge taper 30 and air bearing surfaces 42 and 44. As can be appreciated, the optimum angle at which converging portions 194 of side walls 190 and 192 converge towards one another is highly depended upon the precise slider configuration. In particular, the angle at which side wails 190 and 192 cross the intersection of leading edge taper 60 and air bearing surfaces 42 and 44 (also known as a leading taper break) is depended upon three factors. First, the width of air bearing surfaces 42 and 44 must be sufficient to support leading edge 30 at a specified pitch angle. Second, the width of the relieved cross rail upstream of the taper break towards leading edge 30 defined between parallel portions 196 of side walls 190 and 192 must be sufficient to obtain the advantages of insensitivity of suction force to slider pitch angle. Lastly, the length of converging portions 194 of side wails 191 and 192 which cross the taper break must be sufficient to contain most of the possible variations in the finished taper break location, considering variations in the initial taper length, reflat stock removal and mask alignment.

CONCLUSION

The self-loading, subambient pressure air bearing slider of the present invention requires only one etching cycle, as opposed to a two cycle process for a similar slider of the prior art. The subambient pressure cavity is extended into the leading taper area such that the cavity dam becomes recessed from the air bearing surfaces when the subambient pressure cavity is formed. Therefore, there is no need for a second etching cycle to recess the cavity dam from the air bearing surfaces. As a result, potential cost benefits of the present invention include an increase in ion milling throughput, a reduction in slider fabrication cost, an increase in overall slider yield, and simplified slider design and modeling. Potential performance benefits include lower take-off speeds due to the full-width leading edge taper and improved fly height control due to tighter cavity depth control. The present invention reduces tolerance stack up by reducing the number of etching cycles.

The sliders shown in the figures were modeled with a computer modeling program. The fly height profile for all versions were very similar. The sliders of the FIGS. 2–4 have small pitch angles since the center of subambient pressure is moved toward the leading edge, which pulls the leading edge toward the disc surface. The pitch angle can be increased by moving the gimbal pivot toward the trailing edge, widening the air bearing surfaces near the leading edge, and providing trailing edge reliefs on the side rails.

Slider roll over varying skew angles was larger for the sliders of the present invention than for the slider of the prior art. Slider roll can be controlled by shaping the inner and outer edges of the side rails. Therefore, increased slider roll is not expected to be a problem. The one cycle etching process significantly reduces individual contributions to the fly height tolerance caused by additional etching cycles. The sliders of the present invention were slightly less stiff than the slider of the prior art, even with the lower pitch angle. There was no detectable difference in take-off speed between the sliders of the present invention and the slider of the prior art.

Although the present invention has been described with reference to preferred embodiments, workers skilled in the art will recognize that changes may be made in form and detail without departing from the spirit and scope of the invention. For example, the side rails can have various shapes, such as those disclosed in Strom et al. U.S. Pat. No. 5,062,017 and Chapin et al. U.S. Pat. No. 5,128,822. The dimensions of the slider or any individual feature or contour on the slider can be adjusted to suit a particular application or form factor. For example, the distance at which the subambient pressure cavity extends within the leading edge taper can be adjusted to accommodate a selected taper angle or to achieve a desired recess in the cavity dam. The present invention is applicable to any fluid interface slider used in a variety of storage devices, such as hard disc drives, flexible disc drives, tape drives and even optical disc drives.

What is claimed is:

1. A self-loading slider, comprising:
   a slider body having a leading edge, a trailing edge and first and second side edges;
   first and second raised side rails positioned along the first and second side edges, respectively, with each side rail defining a bearing surface;
   a leading edge taper formed along the leading edge including a portion spanning between the first and second side rails and extending from the leading edge to an intersection with the bearing surfaces of the first and second raised side rails; and
   a subambient pressure cavity defined by the first and second raised side rails and the portion spanning between the first and second side rails, the subambient pressure cavity extending forward along the slider body, past the intersection between the leading edge taper and the bearing surfaces, and terminating prior to the leading edge; and
   first and second side walls at least partially defining the subambient pressure cavity, wherein the first and second side walls converge together as the side walls extend across the intersection towards the leading edge.

2. The self-loading slider of claim 1 wherein the subambient pressure cavity extends laterally into the leading edge taper by a distance that is sufficient to relieve the leading edge taper from the bearing surfaces by approximately one micron.

3. The self-loading slider of claim 1 wherein:

the leading edge taper has a length that is measured from the leading edge to the intersection with the bearing surfaces; and the subambient pressure cavity extends laterally into the leading edge taper by a distance that is no more than ½ the length of the leading edge taper.

4. The self-loading slider of claim 1 wherein the leading edge taper forms an angle with the bearing surfaces of approximately 0.008 radians.

5. The self-loading slider of claim 1 wherein:

the subambient pressure cavity has a cavity depth with respect to the bearing surfaces;

the first and second raised side rails include outside edges; and a portion of the outside edges are relieved to a depth that is approximately equal to the cavity depth such that the first and second raised side rails narrow between the leading and trailing edges.

6. The self-loading slider of claim 1 wherein:

the subambient pressure cavity has a cavity depth with respect to the bearing surfaces;

the first and second raised side rails include inside edges; and a portion of the inside edges are relieved to a depth that is approximately equal to the cavity depth such that the first and second raised side rails narrow between the leading and trailing edges.

7. The self-loading slider of claim 1 wherein the first and second side walls converge together at an angle of between about 20 degrees to about 70 degrees with respect to the intersection of the leading edge taper and the bearing surfaces of the first and second raised side rails.

8. The self-loading slider of claim 1 wherein the first and second side walls converge together at an angle of about 70 degrees with respect to the intersection of the leading edge taper and the bearing surfaces of the first and second raised side rails.

9. A self-loading slider comprising:

a slider body having a leading edge, a trailing edge and first and second side edges;

first and second side rails positioned along the first and second side edges, respectively, with each rail defining a bearing surface;

a cavity dam extending between the first and second side rails, the cavity dam being recessed from the bearing surfaces;

a subambient pressure cavity defined by the first and second side rails and the cavity dam;

a leading edge taper formed along the leading edge and having a surface extending from the leading edge to an intersection with the bearing surfaces of the first and second side rails; and first and second side walls at least partially defining the subambient pressure cavity, wherein the side walls converge together towards the leading edge across the intersection of the bearing surfaces and the leading edge taper.

10. The slider of claim 9 wherein the first and second side walls within the leading edge taper converge towards the leading edge at an angle of between about 20 degrees and about 70 degrees with respect to the intersection of the leading edge taper and the bearing surfaces of the first and second side rails.

11. The slider of claim 9 wherein the first and second side walls within the leading edge taper converge towards the leading edge at an angle of about 70 degrees with respect to the intersection of the leading edge taper and the bearing surfaces.

12. The slider of claim 9 wherein the first and second side walls extend above the cavity dam.

* * * * *

UNITED STATES PATENT AND TRADEMARK OFFICE
CERTIFICATE OF CORRECTION

PATENT NO. : 5,515,219
DATED : May 7, 1996
INVENTOR(S) : Layne S. Ihrke, et al

It is certified that error appears in the above-indentified patent and that said Letters Patent is hereby corrected as shown below:

Col. 3, line 61, after "side", delete "wails", insert --walls--

Col. 9, line 18, after "chapin", delete "et at.,", insert --et al.,--

Col. 11, lines 24, 28, 39, and 49, after "side", delete "wails", insert --walls--

Signed and Sealed this

Eighth Day of October, 1996

Attest:

BRUCE LEHMAN

*Attesting Officer*    *Commissioner of Patents and Trademarks*